Dec. 22, 1964 S. V. ANTHONY 3,161,907
CASTER
Filed Dec. 8, 1961
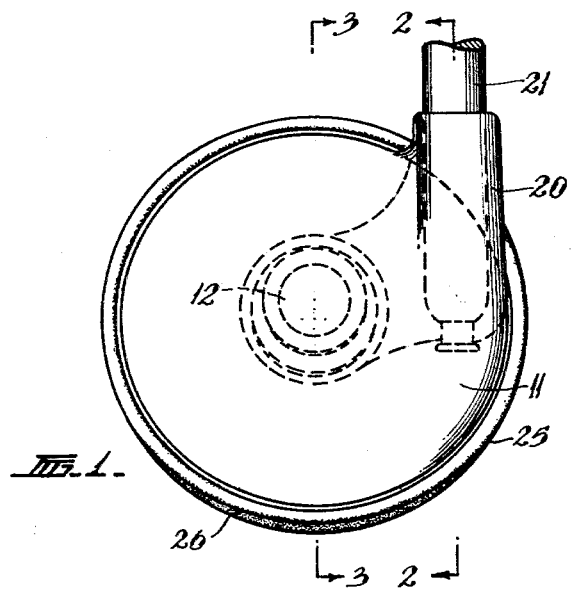
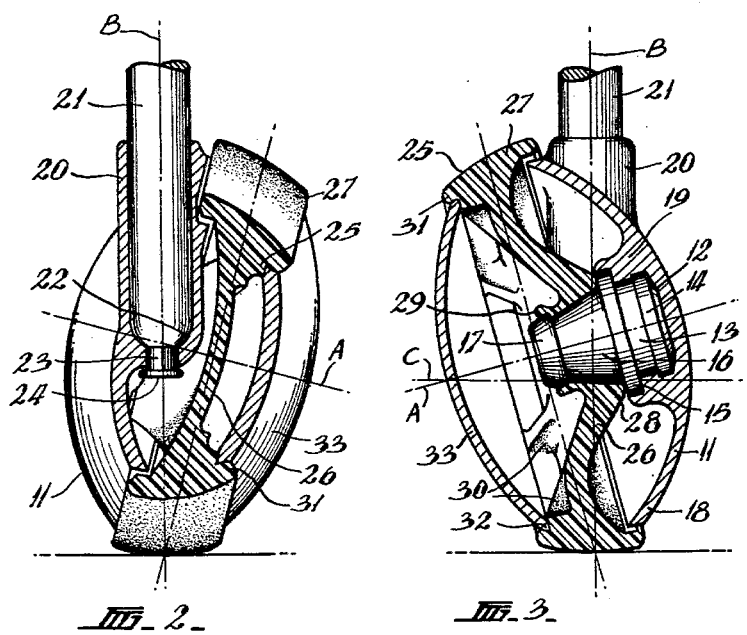
INVENTOR
SILVIO VINCENT ANTHONY
By Irwin S. Thompson
ATTY.

United States Patent Office 3,161,907
Patented Dec. 22, 1964

3,161,907
CASTER
Silvio Vincent Anthony, 172 Perry St., Fairfield,
Victoria, Australia
Filed Dec. 8, 1961, Ser. No. 158,046
Claims priority, application Australia, Dec. 16, 1960,
67,655/60
1 Claim. (Cl. 16—18)

This invention relates to improvements in and connected with casters and is concerned more particularly with casters of a known type wherein a roller is connected to a body for rotation about an inclined axis and the body is adapted for swivelling movement about a vertical axis offset with respect to the roller axis.

The object of this invention is to provide for the economic construction of casters of this general type which are reliable and efficient in operation, and with this object in view a caster according to the invention is broadly characterised in that the roller is mounted for rotation on a tapered bearing arrangement providing a horizontal bearing line.

More particularly the said roller member may be constructed of a lubricous plastic material having a low coefficient of friction.

In the following description of a preferred form of the invention reference is made to the accompanying drawings wherein:

FIGURE 1, is a side view of a caster according to the invention,

FIGURE 2, is a view in section through the swivelling axis of the caster in the direction of the arrows 2—2 of FIGURE 1, and FIGURE 3, is a view in section through the axis of the centre pin of the caster in the direction of the arrows 3—3 of FIGURE 1.

The caster illustrated in the drawings comprises a body 11 made of plastic material moulded about a pin 12 of metallic construction. The pin 12 is of circular cross-section throughout its length and it is provided at one end with a head 13 having a radial flange 14 at the extremity of the head and a further radial flange 15 at the junction of the head and the shank 16 of the pin. The shank 16 tapers away from the flange 15 towards a tip portion 17 comprising a flange with tapered shoulders at each side. The angle of the taper of the intermediate portion or shank 16 of the pin 12 to its axis is about 15 degrees.

The body 11 comprises a part spherical shell 18, the centre of the sphere being located on the axis A of the pin 12. The shell 18 is formed integrally with a boss 19 which is moulded about the head of the pin 12 so that the flange 14 is fully embedded in the plastic material of the body and so that the material of the body is flush with the shoulder of the flange 15 at the commencement of the tapered shank 16. The body 11 also has an integral cylindrical protuberance 20 provided with a cylindrical recess to receive a metallic pin 21 about which the body 11 may swivel. The lower end 22 of the pin 21 is curved so as to be partly spherical and it has a projecting terminal portion 23 of lesser diameter than the remainder of the pin. The part spherically curved portion 22 engages against a correspondingly shaped surface at the base of the recess within the protuberance 20 and the terminal portion 23 projects downwardly through a cylindrical hole opening from the bottom of the recess. When the pin 21 is assembled to the body 11 the lower end of the pin is riveted over as shown at 24 so as to retain the body on the pin while permitting it to swivel about the axis B of the pin.

The axis of the pin 21, i.e. the swivelling axis B, is offset with respect to the axis A of the centre pin 12, and the axis A is inclined at an angle of about 15 degrees to a vertical plane through the swivel axis. Because of this arrangement the line C extending through the lower portion of the shank 16 of the pin 12 is horizontal when the swivel axis B is vertical. This is clearly shown from FIGURE 3 of the accompanying drawings.

The centre pin 12 supports a roller member 25 made of a thermoplastic synthetic resin having a low coefficient of friction of the order of 0.2, high abrasion resistance, high stiffness, low water absorption, and high creep resistance. A suitable material for the purpose having these attributes is the material which is marketed under the trade mark "Delrin," with the further identification "Type 500 X," by E. I. du Pont de Nemours & Co., of Wilmington, Delaware, U.S.A.

The roller member 25 comprises a conical shell 26 formed integrally and merging into a peripheral flange 27 the exterior surface of which is part spherical. The conical shell 26 has a central aperture which extends through it, the wall 28 defining the said aperture being of generally tapered form corresponding to the size and shape of the shank 16 of the centre pin 12. Each end of the aperture is flared to suit a corresponding radius at the junction of the shank 16 with the flanges 15 and 17. At the narrower end of the aperture in the roller member 25 the material is extended to form an annular lip 29 which engages over part of the flange 17. The roller member 25 is provided with strengthening ribs 30 between the tapered shell 26 and the peripheral flange 27, and the peripheral portion 27 is provided with an annular lip 31 defining a recess 32 whereby a spherically dished cover plate 33 may be held in position by the engagement of its periphery in the recess 32 as shown in FIGURES 2 and 3.

The roller member 25 is assembled on the pin 12 by forcing the pin into the central aperture in the roller, the roller being distorted elastically in the process. The roller is retained on the pin by the flange 17 but it can be withdrawn where required by exerting sufficient thrust in the axial direction. The roller member 25 is symmetrical about the axis of its central aperture so that the centre of the spherical peripheral surface of the roller member 25 lies on the axis A of the pin 12.

As indicated by the drawings when the caster is in the correct working position with the pin 21 disposed vertically and fixed to the piece of furniture or other apparatus with which the caster is used, the axis A of the pin 12 is inclined to the horizontal at an angle of 15 degrees and the line of engagement between the pin 12 and the roller member 25, the line C is horizontal. Moreover, the point of engagement of the caster with a level floor lies on a vertical plane extending through the axis B of the pin 21 at right angles to the vertical plane containing the axis A of the pin 12. The geometrical arrangement ensures that the device will function in the correct manner i.e. that it will trail correctly and instantly change its direction so as to continue to trail if the direction of motion of the member to which it is attached is altered.

In accordance with a modified construction according to the invention, the caster may include a ball bearing assembly to provide for adequate mobility for heavy loading. In this case the shank portion of the centre pin 12 carries the inner recesses of a ball bearing assembly while the member 25 carries the outer recesses. The ball bearings are in rings of two different diameters the arrangement being such that the common tangent to balls in the lowermost position of each ring is horizontal when the swivel axis is vertical. This retains the same desirable feature that the bearing line between the central pin and the roller member is horizontal.

I claim:

A caster comprising a body member having a portion adapted to be connected to an article such as furniture and equipment for swivelling movement about a vertical axis on a substantially horizontal supporting surface, mounting means disposed in said body member which has an axis spaced from said portion and being disposed at an inclined angle with respect to said supporting surface, said mounting means including a tapered bearing portion providing a bearing section which is substantially parallel with respect to said supporting surface, and an inclined roller member having engaging means centrally therein and a peripheral flange extending exteriorly of said body member, said engaging means including a bore having a tapered configuration corresponding to that of said tapered bearing portion so that when said engaging means is mounted on said tapered bearing portion for rotation with respect to the axis of said mounting means the peripheral flange of said inclined roller member engages said supporting surfaces at a point in a vertical plane extending through said vertical axis which vertical plane is perpendicular with respect to said bearing section, said tapered bearing portion including a flange adjacent said body member and a further flange at a tip portion of said tapered bearing portion, said engaging means defining a wall having said bore therethrough and in engagement with said tapered bearing portion between said flanges, one side of said wall adjacent said bore engaging the first-mentioned flange, the other side of said wall adjacent said bore having an annular lip engaging said further flange to maintain said roller member mounted on said mounting means.

References Cited in the file of this patent

UNITED STATES PATENTS

| | | |
|---|---|---|
| 1,892,845 | McGrath | Jan. 3, 1933 |
| 2,213,967 | Roche | Sept. 10, 1940 |
| 2,732,267 | Stover | Jan. 24, 1956 |
| 3,054,135 | Shepherd | Sept. 18, 1962 |

OTHER REFERENCES

Dupont Manual on "Delrin," June 1957, pages 11 and 37 (copy in Division 60).